June 18, 1940.    C. S. BROWN    2,204,842
INTERNAL COMBUSTION ENGINE
Filed April 22, 1938    4 Sheets-Sheet 4
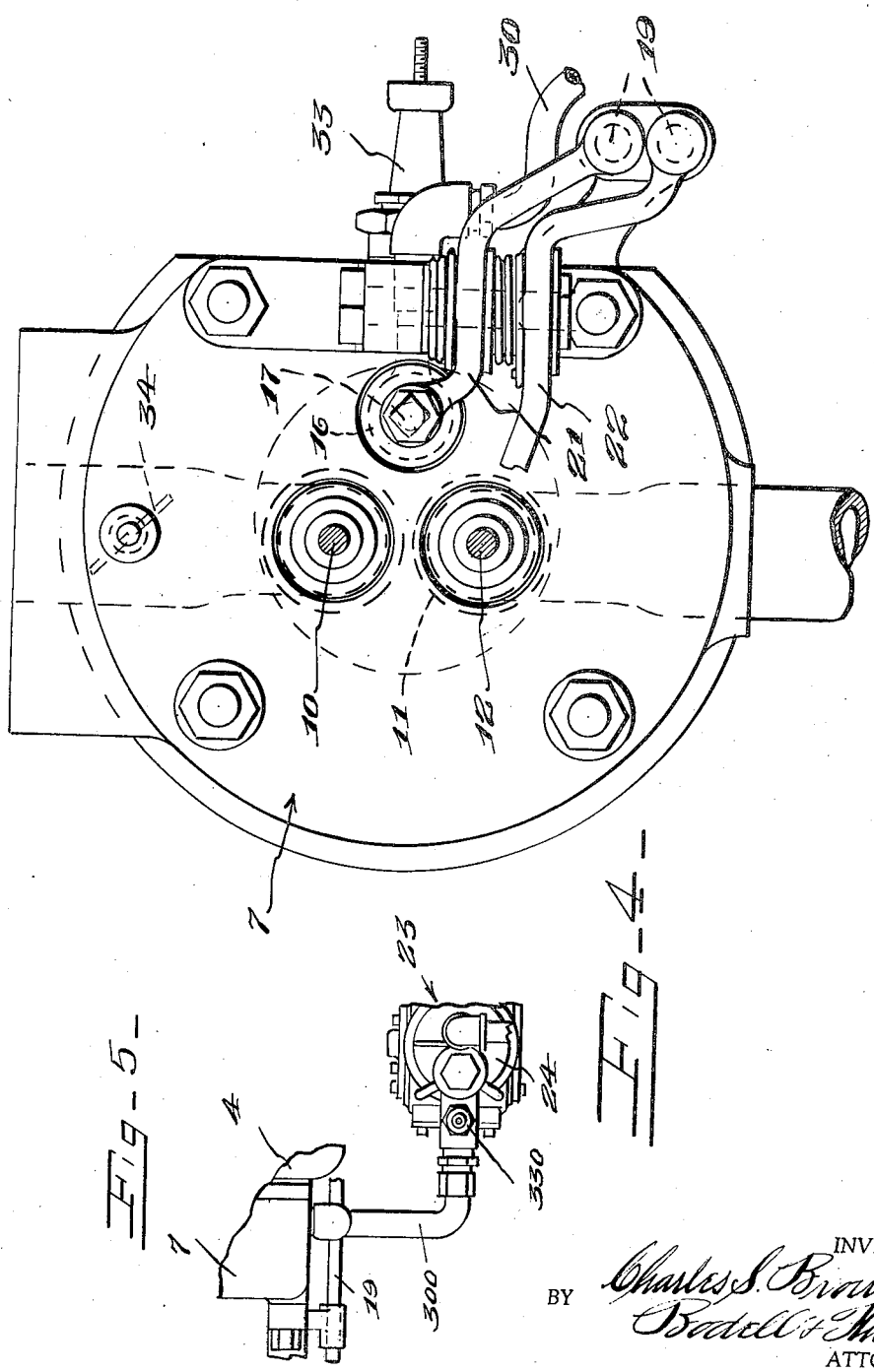

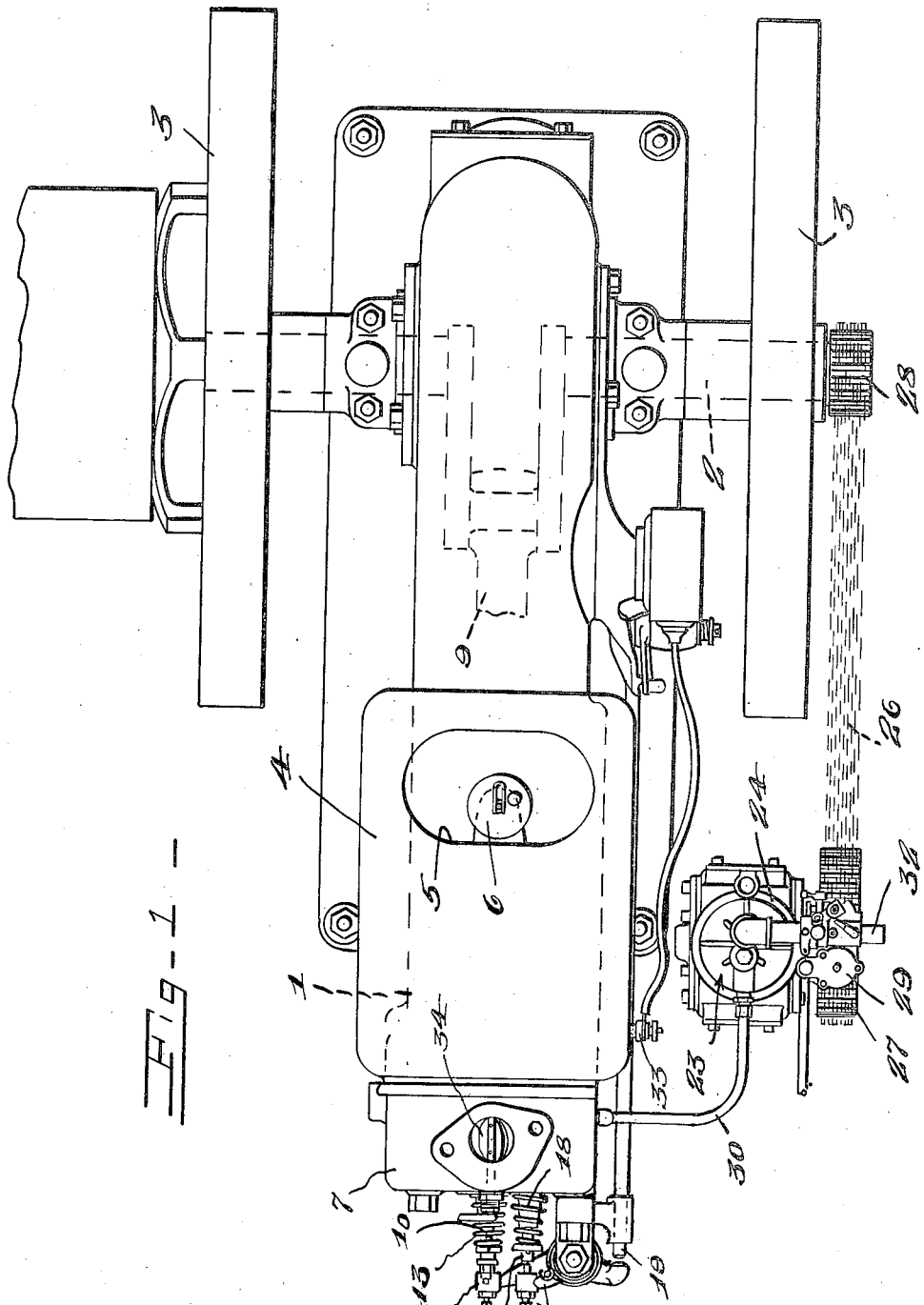

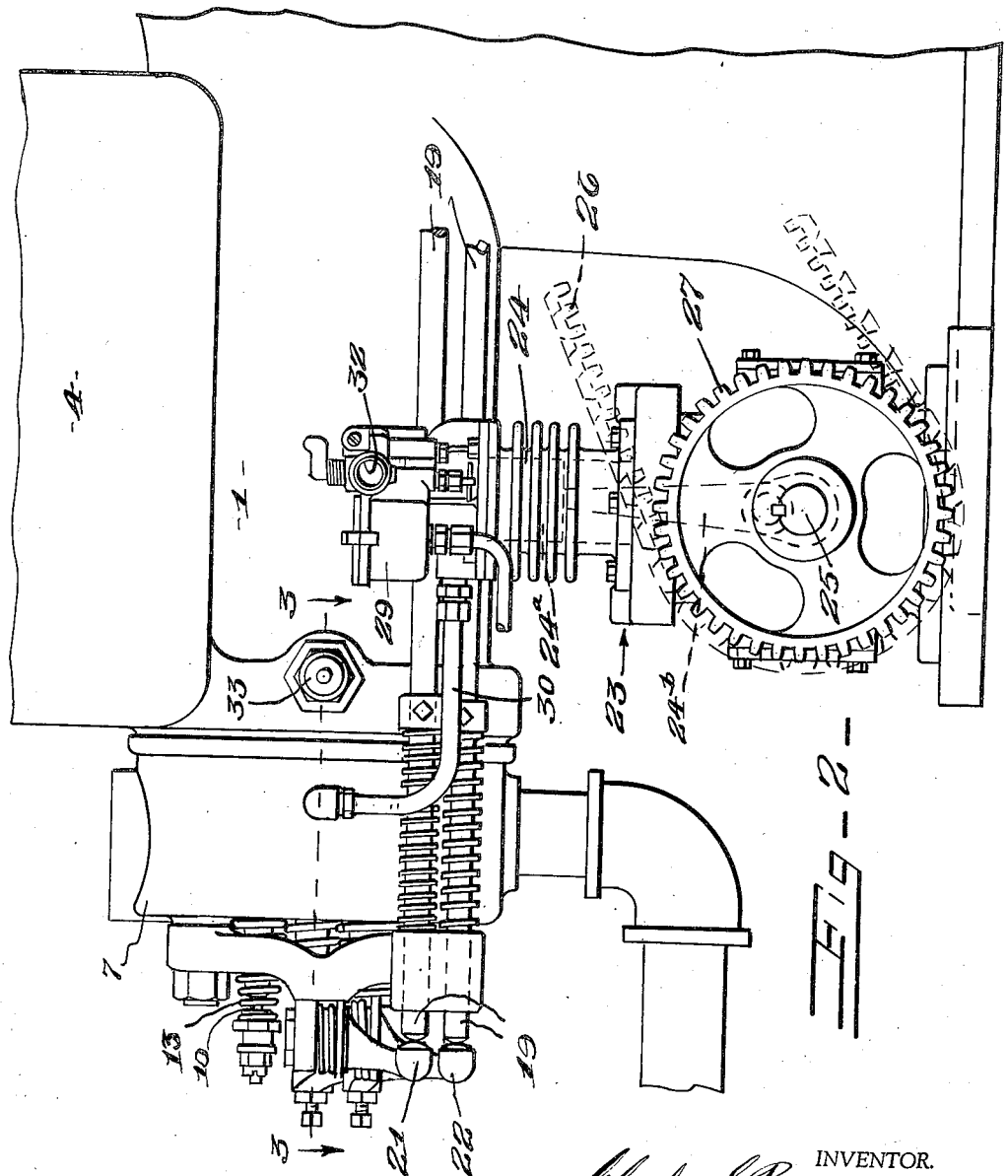

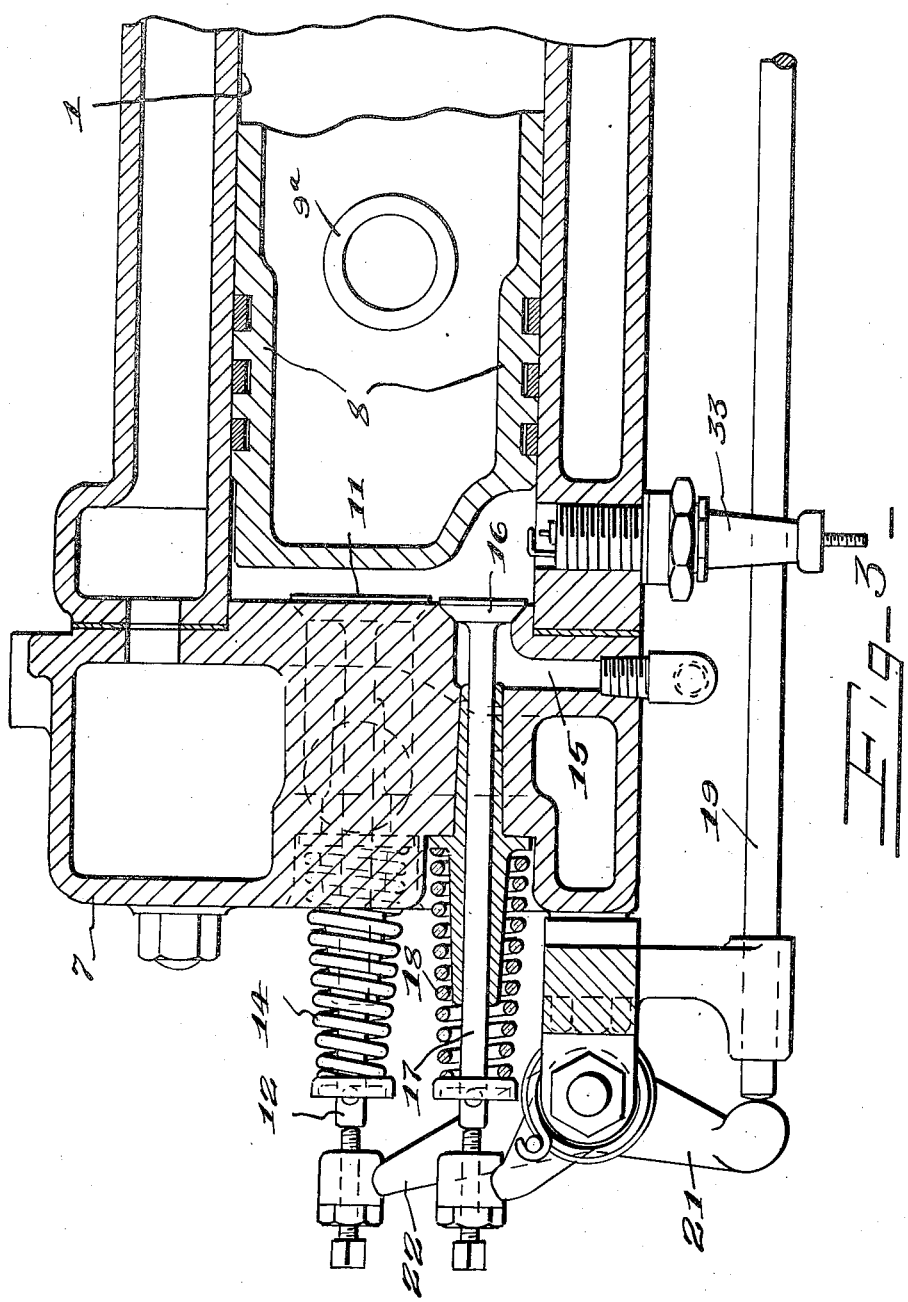

Patented June 18, 1940

2,204,842

UNITED STATES PATENT OFFICE 2,204,842

INTERNAL COMBUSTION ENGINE

Charles S. Brown, Syracuse, N. Y.

Application April 22, 1938, Serial No. 203,631

1 Claim. (Cl. 123—119)

This invention relates to internal combustion engines and has for its object an engine in which the combustible mixture is formed by a compressor and forced into the engine cylinder through a valve controlled port, the valve of which is actuated and timed by the engine to open to permit the rich mixture of fuel and air to be forced into the compressed air of the gas engine cylinder or forced into air being compressed therein when the engine piston is on or approaching the end of its compression stroke, the feature residing in a mechanically operated intake valve for the rich fuel and air mixture by the compressor, and forced into the cylinder, and the timing of the valve.

By rich mixture is meant one in which there is more fuel than can be burned in the air in the mixture or in which there is insufficient air to support complete combustion of the fuel.

The invention consists in the novel features and in the combinations and constructions hereinafter set forth and claimed.

In describing this invention, reference is had to the accompanying drawings in which like characters designate corresponding parts in all the views.

Figure 1 is a plan view of an internal combustion engine embodying this invention.

Figure 2 is an enlarged fragmentary elevation of parts seen in Figure 1.

Figure 3 is an enlarged sectional view on line 3—3, Figure 2.

Figure 4 is an end elevation of the cylinder head.

Figure 5 is a fragmentary elevation of parts seen in Figure 1 illustrating a different location of the spark plug for igniting or partly precombusting the rich mixture before it enters the engine cylinder.

I designates the cylinder of the engine supported on a suitable frame; 2 the crank shaft; 3 the fly wheels thereon. 4 designates a water tank or hopper for supplying water for the cooling system, this being located above the cylinder and covering the same. In Figure 1, the water tank is provided with an opening 5 in its top through which the water may be poured into the tank, and incidentally, an oiling device 6, similar to a common oil cup, for the engine cylinder appears above the opening 5.

7 designates the head of the cylinder and both the cylinder 1 and the head 7 are here shown as formed with suitable water jackets. 8 designates the piston movable in the cylinder and 9 the connecting rod with wrist-pin bearing at 9a.

The engine is provided with suitable valve-controlled intake and exhaust ports, and in the engine here shown, these ports are formed in the head 7.

10 designates the stem of the air intake valve controlling the air intake port, and 11, the exhaust valve having a stem 12. The air intake valve is similar to the exhaust valve 11. 13 and 14 designate, respectively, springs for these valves for closing and holding them closed. The air intake valve is opened against the action of its spring 13 by suction. The exhaust valve is mechanically operated.

15 designates a fuel intake port for a rich mixture of fuel and air, and 16 a valve for controlling said port, this valve having a stem 17 and being held closed by a spring 18. This valve is also mechanically operated. The valve 16 and the exhaust valve are operated by suitable valve operating mechanism, as push rods 19, coacting with stop means actuated by the cam shaft and with rocker arms 21, 22 acting on the ends of the stems of the fuel valve 16 and the exhaust valve 11, respectively.

23 designates the compressor of the cylinder and piston type including a cylinder 24 and a plunger or piston 24a and connecting rod 24b therein connected to the compressor crank shaft 25, which is actuated from the crank shaft 2 of the engine, as by means of a chain 26 running over pulleys or sprockets 27, 28, respectively, on the compressor crank shaft 25 and on the engine-crank shaft 2. The ratio is such that the compressor crank shaft runs at half the speed of the engine crank shaft. The intake side of the compressor or cylinder 24 thereof is connected to the outlet of a carburetor 29 and the outlet side of the compressor cylinder by a conduit 30 to the port 15. A suitable choke valve is located in the air intake 32 of the carburetor 29.

The firing is timed in any well known manner. The spark plug 33 is located in the cylinder compression space near the rich fuel air intake valve 16 and adjacent a well in the piston near said valve, so that the rich fuel air mixture charge is ignited immediately and the flame or explosion propagates in the air compressed in the cylinder. The air of the rich fuel air mixture acts merely as a carrier for the fuel until the point of combustion is reached when it becomes part of the air in the cylinder to unite in burning the fuel. Incidentally, the fuel is better mixed with the compressed air and therefore more readily mixes with the air in the cylinder than raw fuel would, if injected directly into the engine cylinder air.

The air intake port is provided with a suitable manually operated throttle valve 34.

As seen in Figure 5, the spark plug 330 may be located in the compression chamber of the compressor cylinder 24 or in the outlet conduit 300 leading therefrom, corresponding to the outlet pipe 30, or in position to fire the charge outside of the engine cylinder, and this pipe may be made relatively larger than the conduit 30 (Figures 1 and 2) in order to permit partial combustion by the spark plug, or the spark plug may be located in this conduit 300.

In any form of my invention, a rich fuel is formed in the compressor and injected into the engine cylinder, where the air compressed therein is sufficient to support complete combustion of the rich charge formed by the compressor and partial combustion may take place in the conduit 300 when the spark plug is located in the compressor cylinder or in the conduit 300 or partial combustion take place in the rich fuel just after it passes the valve 16 (Figure 3) and comes adjacent the spark plug 33.

In operation, during the suction stroke of the engine piston 8, air is drawn into the engine cylinder 1 and also air is being drawn through the carburetor into the compressor cylinder 24 forming a rich combustible mixture in the compressor. Also, the air is being drawn through the carburetor into the compressor cylinder during both the explosion and the scavenging strokes of the engine piston 8, as the compressor is running at half the speed of the engine. During the suction and compression strokes of the engine piston 8, the rich mixture is being compressed by the compressor cylinder 24 but is not injected into the engine cylinder, until the valve 16 is opened, this being timed to open when the engine piston 8 approaches the end of its compression stroke. It is fired by the spark plug 33 at the end of the compression stroke of the engine piston or as the engine piston approaches the end of its compression stroke.

What I claim is:

In a four cycle internal combustion engine, a cylinder having valve controlled air intake and exhaust ports, a piston movable in the cylinder, a crank shaft and connecting rod, the cylinder also having a fuel intake port, a valve for controlling the last port, means for compressing a charge of a combustible mixture relatively rich in fuel including a compressor unit including a movable member actuated by the engine and timed to be at the height of its compression stroke when the engine piston is approaching the end of its compression stroke, and conduit means connecting the compressor unit directly with the fuel intake port of the engine cylinder, a carburetor for regulating said mixture mounted on and connected to the intake side of the compressor, and valve mechanism operated by the engine for opening the fuel intake valve while the engine piston is approaching the end of its compression stroke, allowing the cylinder to receive the full charge of said compressor unit, and a spark plug for firing the rich mixture charge, the spark plug being located outside of the compression chamber of the cylinder and arranged to fire the charge before the same passes through the fuel intake port.

CHARLES S. BROWN.